UNITED STATES PATENT OFFICE.

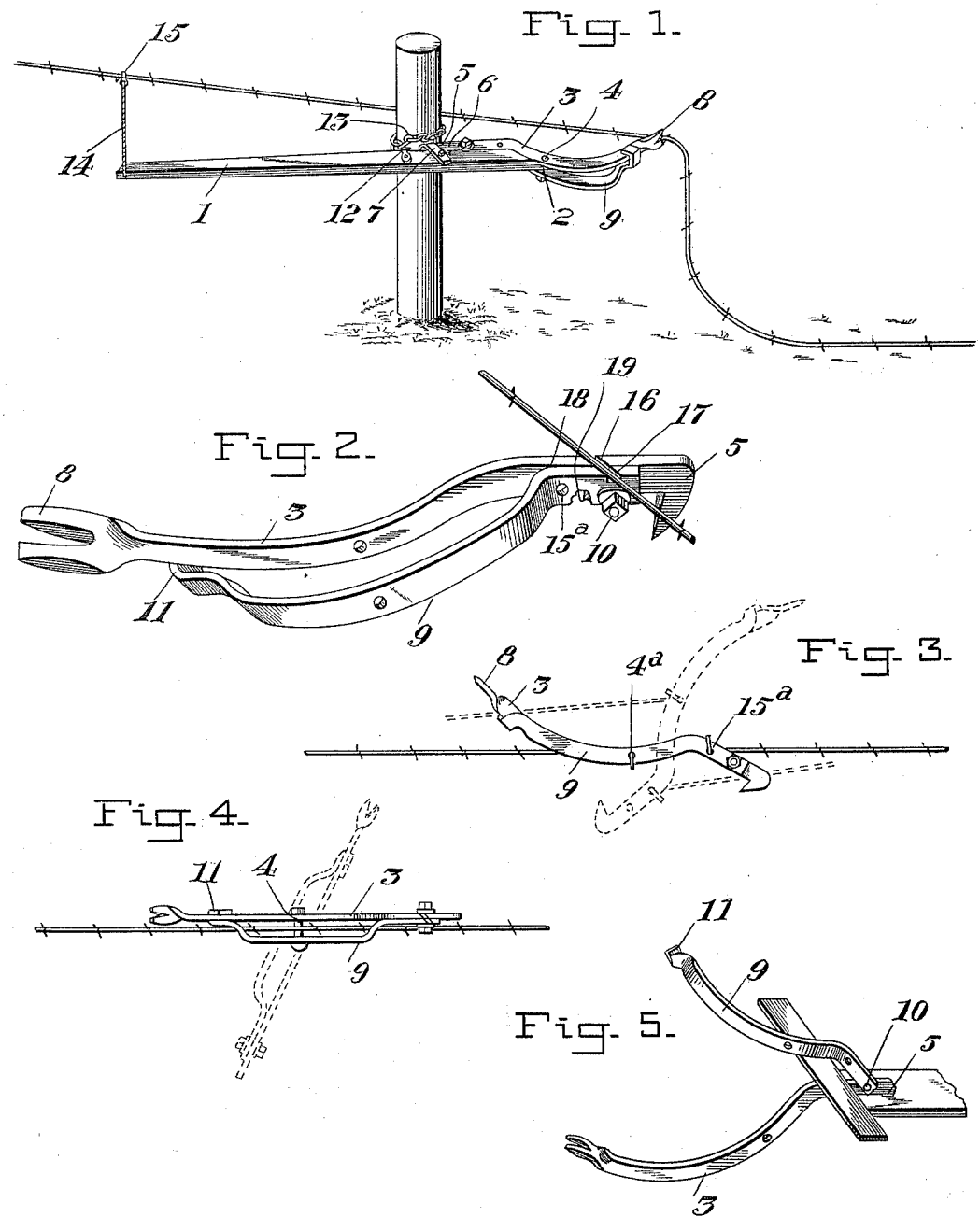

JOHN HARPMAN, OF VICTORIA, ILLINOIS.

WIRE STRETCHER AND MENDER.

SPECIFICATION forming part of Letters Patent No. 600,312, dated March 8, 1898.

Application filed June 12, 1897. Serial No. 640,525. (No model.)

*To all whom it may concern:*

Be it known that I, JOHN HARPMAN, of Victoria, in the county of Knox and State of Illinois, have invented certain new and useful Improvements in Wire Stretchers and Menders; and I do hereby declare the following to be a full, clear, and exact description of the invention, such as will enable others skilled in the art to which it appertains to make and use the same.

The object of this invention is to provide a combination - tool or farmer's implement which is more especially adapted to repairing wire fences, by which the wires can be stretched in building fences, staples drawn, and wires tightened in repairing the fence, also including a construction presenting a wire-cutter and shearing-blades for cutting tin.

To these ends and to such others as the invention may pertain the same consists of a lever having a bar secured to its inner end and presenting a claw, a chain attached to an intermediate portion of the lever, and a flexible connection at the outer end of the lever carrying a hook, the bar of the lever being detachable and consisting of two parts pivotally connected to each other and of peculiar construction to adapt the implement for special purposes, all as will be hereinafter fully described in the following specification and the novel features particularly set forth in the claims.

In the accompanying drawings, forming part of this specification, Figure 1 is an elevation showing the application of my invention in stretching wire. Fig. 2 is a perspective view of the detachable bar, illustrating its operation in cutting wire. Fig. 3 is a view of the detachable bar, showing it applied in connecting the ends of a broken wire. Fig. 4 is a similar view showing the bar employed in tightening wire fences. Fig. 5 is a view showing the application of the detachable bar in cutting tin.

Referring to the drawings by numerals, 1 designates the lever of the implement, the inner end of which is cut away on one side, as shown at 2, to receive a curved bar 3, which is connected thereto by the removable bolt 4, the inner end of said bar having a hooked end 5, which enters a recess 6 therefor in the lever and is held in engagement therewith by means of a metal strap 7, the latter being pivoted to the lever to permit it to be swung in and out of engagement with the bar. The outer end of this bar is turned and bifurcated to present a claw 8. In connection with the bar 3 is a second bar 9, pivoted at its inner end to the aforesaid bar by means of a bolt 10 and at its outer end is turned into a hook 11 to engage said bar. The bar 9 is looped at its intermediate portion to lie over the opposite side of the lever 1 and has an opening or hole through which the bolt 4 passes. In connection with the lever and bar forming the claw the said lever is provided with a metal loop 12, having a chain 13 connected thereto at one end, the opposite end of said chain carrying a hook. This chain is adapted to pass around a fence-post when the implement is being used in building a fence. The outer end of the lever is provided with a flexible connection 14, carrying a hook 15 at its outer end.

As hereinbefore stated, the flat bar or plate 3, with its pivoted member 9, is removable from the lever in order that it may be employed or applied to the different uses for which it is designed. For this purpose the said plates are each provided with a bolt-hole 15$^a$, that registers, and at the pivot the plates are notched diagonally, presenting recesses 16 and 17, which are brought on a line with each other when the plates are together. In addition to this the opposite edges of the plates are sharpened to present the cutting edges 18 and 19, forming shearing-blades.

In the operation of the implement, when the same is used in building a wire fence, the plates are secured to the lever, as shown in Fig. 1, and the chain looped around the fence-post to hold the implement in connection therewith, the wire being then passed into engagement with the claw and the lever thrown in the proper direction to stretch the wire, after which the hook at the outer end of the lever is passed into engagement with the stretched wire, holding the same during the process of securing the wire to the post. In this application the device forms a very effective wire-stretcher.

When it is desired to cut a wire, the flat bar or plate 3 is removed from the lever, and after the wire is placed in the recesses 16 and 17 the member 9 of the plate is swung upon its pivot and brings the inner edge of its rear wall in contact with the wire, pressing it against the opposite edge of the recess in the main bar, the said recesses being so relatively located with respect to the pivot that the cutting edges tend to move the wire into the bottom of the recess in cutting the same. In connecting the ends of broken wire the said ends are passed through the bolt-holes 4ª and 15ª and the plates turned, which will twist the wires upon themselves and securely couple them, it being understood that the ends after being passed through the plates are bent or turned thereon. In taking up slack or tightening fence-wire the implement is passed over the wire, so that the curved plates will embrace the same, after which the bolt is replaced in the registering bolt-holes 4ª to hold the wire in connection with the plates, and by turning the latter the wire will be twisted, riding on the curved surfaces and forming a loop around the bolt. In this application the plates serve as a lever for twisting the wire and will permit sufficient power to be exerted upon the same to thoroughly take up the slack.

In using the device for the purpose of cutting tin the hook at the end of the plate 3 is driven into a board or other support and the member 9 swung upon its pivot to bring the cutting edge thereof immediately above the cutting edge of the main bar or plate. In this position the tin is laid upon the upper edge of the main bar, and the member 9 can be manipulated to make a shearing cut by bringing the cutting edge of the same down upon the tin.

From the foregoing description, in connection with the accompanying drawings, it will be seen that I provide an implement which can be put to a number of uses and effectively employed for the purpose mentioned. The parts can be readily connected and disconnected from the lever, as it is only necessary to manipulate the bolt and metal strap.

Having thus described my invention, what I claim as new, and desire to secure by Letters Patent, is—

1. In an implement for the purpose set forth, the combination with a lever, of a flat bar or plate detachably connected thereto and presenting a claw, and a flat bar or plate pivotally connected to the main bar or plate, the said plates having communicating notches or recesses at their pivot, substantially as shown and described.

2. In an implement for the purpose set forth, the combination with a lever, of a flat bar or plate having a claw at one end, a second plate pivoted thereto, registering bolt-holes through the plates by which they are secured to the lever, one of the plates being bent at its upper end to embrace the other plate, and registering recesses in the plates at their pivot, substantially as shown and described.

3. In an implement for the purpose set forth, the combination of a flat bar or plate curved longitudinally, a second bar or plate pivoted to the main bar and curved to correspond therewith, and bolt-holes through the plates, substantially as shown and described.

4. In an implement for the purpose set forth, the combination of a flat bar or plate curved longitudinally, a second bar pivoted thereto, bolt-holes through the bars or plates, and notches formed in the plates adjoining their pivot, substantially as shown and described.

5. In an implement for the purpose set forth, the combination with a flat bar or plate having a pointed hook at one end, a second plate pivoted to the main plate and adapted to be connected thereto, said plates having sharpened edges adjoining their pivot, and a socket formed at the outer end of one of the plates; together with a lever to which the plates are removably secured, said lever having a metal strap which is passed over the hooked end of the flat bar or plate, substantially as shown and described.

6. In an implement for the purpose set forth, the combination with a lever having flexible connections carrying hooks, flat bars or plates detachably connected to the lever and curved longitudinally, said plates being pivoted to each other and separated at the intermediate portion, one of the plates having a hooked end and claw while both plates are provided with recesses at their pivot and cutting edges adjoining their pivot, substantially as shown and described.

In testimony whereof I have signed this specification in the presence of two subscribing witnesses.

JOHN HARPMAN.

Witnesses:
J. H. HARRISON,
THEO. SEVERIN.